R. KITSON.
SCREEN CYLINDER FOR COTTON PICKERS.
No. 76,926.
Patented Apr. 21, 1868.
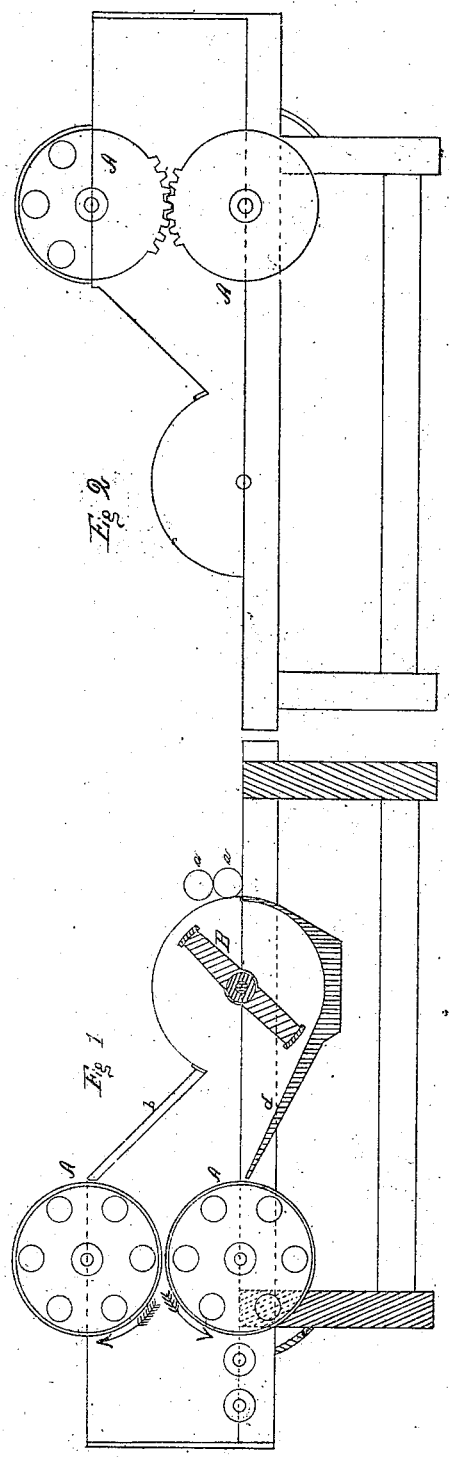
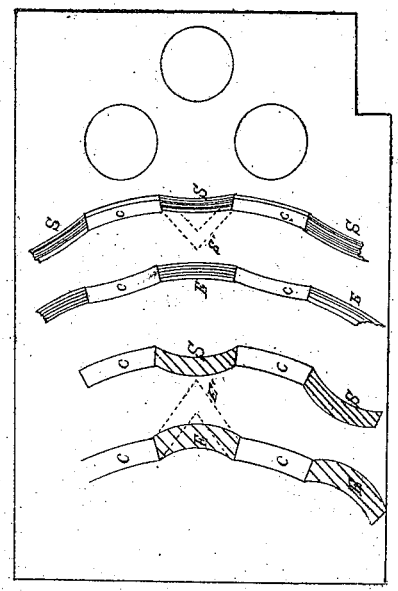
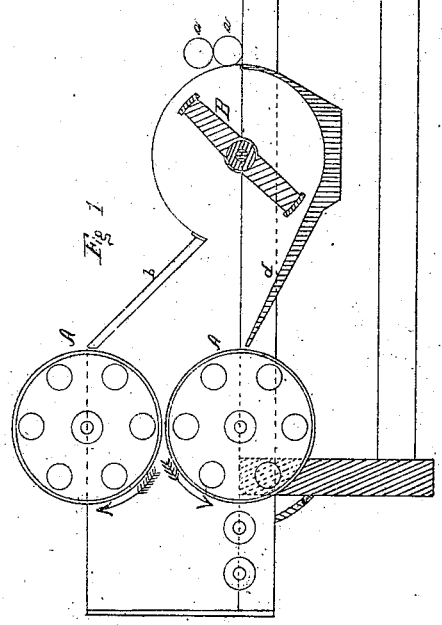
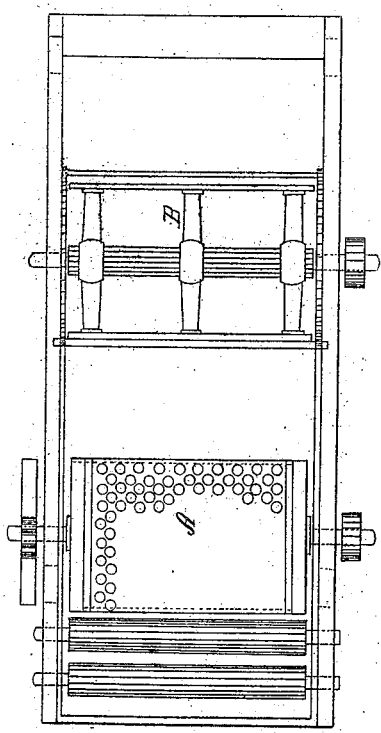

United States Patent Office.

RICHARD KITSON, OF LOWELL, MASSACHUSETTS.

Letters Patent No. 76,926, dated April 21, 1868.

---

IMPROVEMENT IN SCREEN-CYLINDERS FOR COTTON-PICKERS.

---

*The Schedule referred to in these Letters Patent and making part of the same.*

---

TO ALL WHOM IT MAY CONCERN:

Be it known that I, RICHARD KITSON, of Lowell, in the county of Middlesex, and State of Massachusetts, have invented certain new and useful Improvements in Cylinder-Screens for Cotton-Pickers, of which the following is a full, clear, and exact description, reference being had to the accompanying drawings, making part of this specification, in which—

Figure 1 is a longitudinal vertical section of a cotton-picker, having my improvement applied thereto.

Figure 2 is a side elevation.

Figure 3, a plan or top view, showing one perforated cylinder, A, the whole surface of which should be perforated, as shown on a portion thereof.

Figure 4 represents a plan and four sectional elevations of a small portion of the perforated screen, very much enlarged.

This invention relates to the cylinder-screens which are used in machines for picking or for opening and cleaning cotton or other fibrous substances, and has for its object to spread or diffuse the blast of air to a greater or less extent on the surface of the screen-cylinder, according to the nature of the fibrous substance under operation, or the length of the staple or fibre of such substance or material.

The rotary beater, B, takes the cotton or other fibrous substance from the feed-rolls a, and throws it forcibly downward over a series of slats or other open work, thence round and outward, between the top cover, b, and the bottom or incline d, to and against the surfaces of the screen-cylinders A, which rotate slowly in opposite directions, as indicated by arrows. A strong blast of air, generated and blown by the beater, B, or other operating-cylinder, blows the cotton with great force against the surface of each of the screen-cylinders. The dirt, dust, and refuse matter, or a considerable portion of them, pass through the perforations c, to the interior of each cylinder, and a draught-fan or other suitable device, connected with one or both ends of each or either cylinder, draws the dust and much of the refuse matter out from such cylinders, and blows them off to some place of deposit, all as in the ordinary cotton-opening machine.

To produce the best results, and to free the cotton from dust and dirt as much as possible, and at the same time prevent the cotton from passing through the perforations with the dust and dirt, a peculiar cylinder-surface is necessary, and the length of the staple or fibres of the cotton to be operated upon should be taken into consideration. As a general rule, cotton-manufacturers use each a particular grade or staple of cotton, and when cotton of a long or a medium length of staple is used, the cylinder-surface should be slightly or more or less raised between the perforations, as shown at E, in fig. 4; but if cotton of a short staple, or a staple below the medium length, is used, then the cylinder-surface should be more or less depressed between the perforations, as shown at S, in fig. 4. In all cases, the perforations should be small, and very near together. I generally make the perforations about one-eighth of an inch in diameter, and as near together as they can be punched without breaking into each other—say about one-sixteenth of an inch apart.

When the long-staple cotton is blown against the screen-cylinder which has the surface thereof raised, (as shown at E, fig. 4,) the tendency of the air-blast is to concentrate at and pass through each perforation, carrying with it much of the dust and dirt from the cotton, but the long staple or fibres of medium length will lie across the perforations, but cannot pass through. When the short or comparatively short-staple cotton is blown against the cylinder-screen which has the surface thereof between the perforations depressed, (as shown at S, fig. 4,) the natural tendency of the air-blast is to spread or diffuse itself in every direction, spreading or diffusing the short fibres of cotton with the air-blast, and preventing said short fibres remaining on or in contact with the surface of the screen-cylinder a sufficient length of time to be drawn through the perforations.

It will be readily seen and understood that the cylindrical surfaces of the screen-cylinders A may be so raised or depressed between the perforations as to clean long or short-staple cotton, or other fibrous substances, in a superior manner, and without wasting the fibres.

To carry out this invention to the greatest possible extent of raising or depressing the cylindrical surface between the perforations, the raised surfaces may be brought up to pointed cones, as shown in red lines at E', in fig, 4; and if short-staple cotton were blown on to a cylinder having such a pointed-cone surface, it is believed that nearly all such cotton would be blown through the perforations into the cylinder with the dust and dirt, but wool, or other similar and long fibres, would lie in bulk on the apices of the cones while the dust was drawn out by the draught on the cylinder; or the depressions might be made in deep conical form, as shown in red lines at S', in fig. 4, but it is believed that neither dirt nor short cotton could be forced through the perforations of such a cylinder to any extent, as the blast of air would react against the conical sides of such depressions, and blow most of the cotton away from the cylinder, instead of into contact with it. I am of the opinion that neither of these extremes would produce satisfactory results, but a cylindrical surface, properly raised or depressed, even though slightly, does produce very satisfactory results in cleaning cotton and other fibrous substances.

The screen portion of my improved cylinder-screen should be made of a very thin material, like thin sheet zinc, or hard-rolled pasteboard, or card-board, as the friction of the air-blast or current of air on the sides of perforations made through a thick material or substance would very much retard the action of the current of air in its passage through the perforations.

When the screen is made of hard-rolled card-board, then the edges of or around the perforations may be raised, or turned outward or inward, thereby forming a cylindrical surface, which is raised or depressed (as the case may be) between the perforations; and I find, by winding thin perforated sheet zinc around cylinder-heads, the winding or bending of such finely-perforated zinc has an effect to raise the surfaces between the perforations sufficiently to diffuse the air-blast, and properly clean some kinds of cotton. By using the hard-rolled card-board for the cylinder-screens, I am enabled to produce a much cheaper cylinder than by any other material.

Having fully described my invention, what I claim as new, and desire to secure by Letters Patent, is—

A cylinder-surface, which is more or less raised or depressed between the perforations, substantially as shown and described, and for the purpose or purposes specified.

RICHARD KITSON.

Witnesses:
JOHN E. CRANE,
B. T. MILLS.